July 7, 1953 C. C. BAKER 2,644,371
ROUTER WITH ADJUSTABLY MOUNTED DRILL FOR STEREOTYPE PLATES
Filed March 14, 1949 3 Sheets-Sheet 1

INVENTOR.
CRAIG C BAKER
BY
ATTORNEY

July 7, 1953 C. C. BAKER 2,644,371
ROUTER WITH ADJUSTABLY MOUNTED DRILL FOR STEREOTYPE PLATES
Filed March 14, 1949 3 Sheets-Sheet 2

INVENTOR.
CRAIG C BAKER
BY
ATTORNEY

Patented July 7, 1953

2,644,371

UNITED STATES PATENT OFFICE 2,644,371

ROUTER WITH ADJUSTABLY MOUNTED DRILL FOR STEREOTYPE PLATES

Craig C. Baker, Los Angeles, Calif.

Application March 14, 1949, Serial No. 81,220

3 Claims. (Cl. 90—14)

This invention relates in general to routers for stereotype plates, and in particular, to routers for curved and especially semi-cylindrical stereotype plates.

In routers of this general class it is customary to have a suitable support for the stereotype plate—for example, a cylinder on the surface of which the stereotype plate is held while the routing work is being done—and a router head assembly in which a rotating routing instrument or drill, having an off-center point for routing out the metal, is carried.

In addition to arranging for movement of the router head assembly transversely with respect to the work and for oscillating the cylinder or other support for the work, it is necessary to provide either means whereby the drill may be moved down and up with respect to the surface of the stereotype plate or means whereby the stereotype plate can be moved up and down into and out of engagement with the drill. In some routers the router head assembly, together with the supporting rails on which the assembly is mounted for transverse travel, are moved down as an entire unit in order to bring the drill into contact with the stereotype plates; in others, the cylinder or other support for the stereotype plate is moved up as a unit in order to bring the plate into contact with the drill; still others swing or tilt the router head downwardly to accomplish this result. It has been my observation that in all of these cases the means for bringing the drill into contact with the stereotype plate involve a complicated device which is awkward to manipulate and which requires a skillful operator; and in addition, I have observed that some of these routers have inefficient or inadequate means for providing for a constant uniform cutting depth.

One of the objects of this invention is to provide an improved router in which there will be no up and down movement either of the stereotype plate and its supporting element, or any down and up movement of the entire router head assembly, but in which the required up and down movement will be confined to the drill and its supporting spindle.

Another object of this invention is to provide an improved router in which the cutting depth to which the drill can operate will be simply, definitely, and adjustably controlled so that a uniform predetermined cutting depth can be maintained very accurately during the entire work.

A further object of the invention is to provide an improved router which will be easy and simple to operate and by means of which the performance of the work will be facilitated.

These objects and other incidental advantages I attain by providing an improved router having a novel router head assembly, by providing novel means for obtaining vertical movement of the router drill and its supporting spindle in the assembly, and by otherwise constructing and arranging my improved router as hereinafter described with reference to the accompanying drawings.

In the drawings:

Fig. 5 is a schematic view of the means by which the router drill and its spindle are caused to move downwardly when desired to bring the drill into contact with the stereotype plate.

Figure 1:
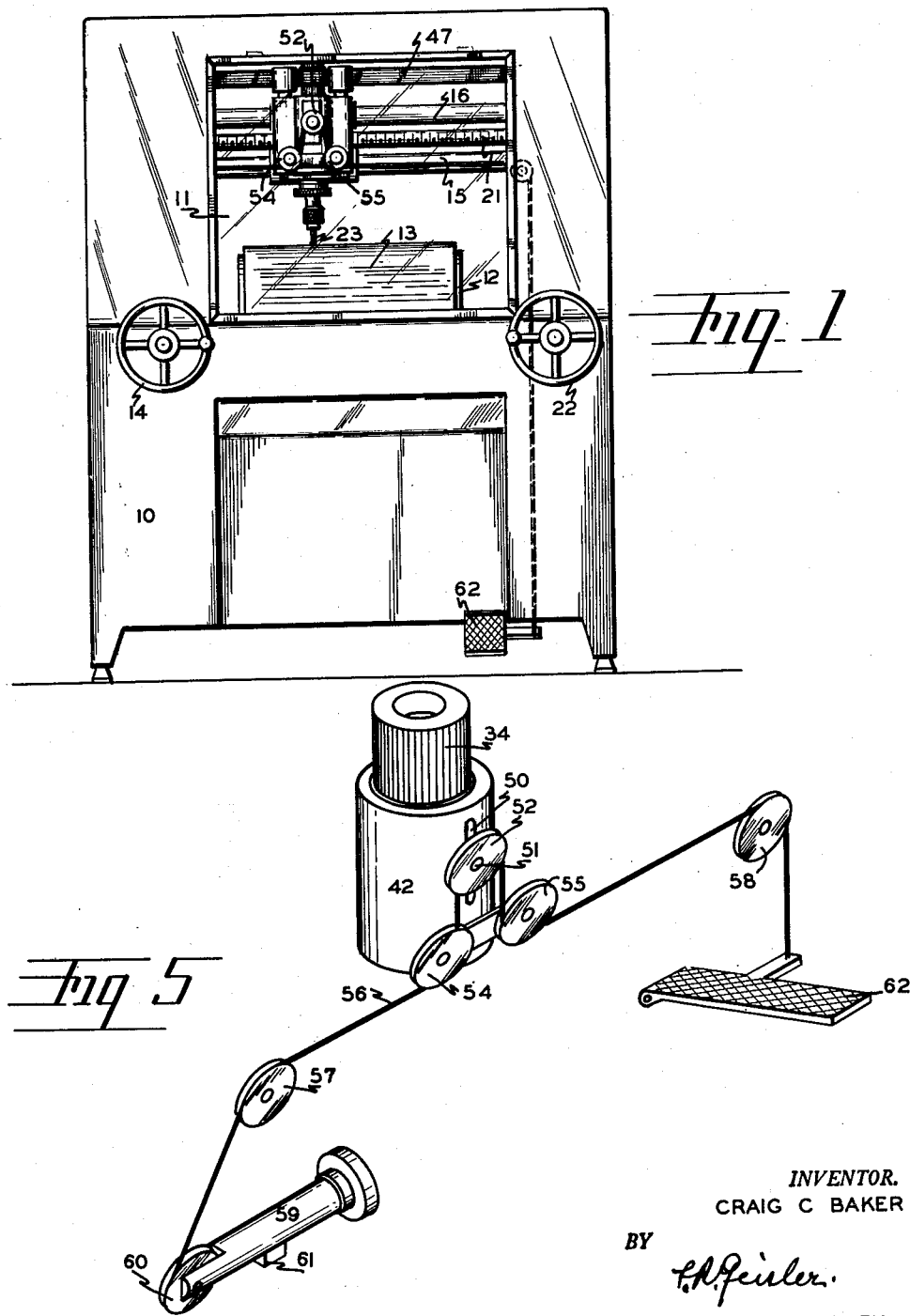
Fig. 1 is a front elevation of my entire router.

Referring first to Fig. 1, my improved router is inclosed in a suitable housing indicated in general by the reference character 10. The housing is supplied with an upper door or window 11 preferably containing glass or other transparent material through which the routing operation can be carefully observed and through which the stereotype plate can be inserted in place in the router.

The sterotype plate, which is indicated in Fig. 1 by the reference character 13, is assumed to be of the usual semicylindrical shape and is mounted on a cylinder 12 by suitable means (not shown). The mounting cylinder 12 in turn is supported on a horizontal shaft, and suitable gear means including a worm gear (not shown) is connected with the shaft and cylinder and with the external hand wheel 14 by means of which the operator can cause the mounting cylinder 12 to be rotated in either direction as desired.

Figures 2, 3:
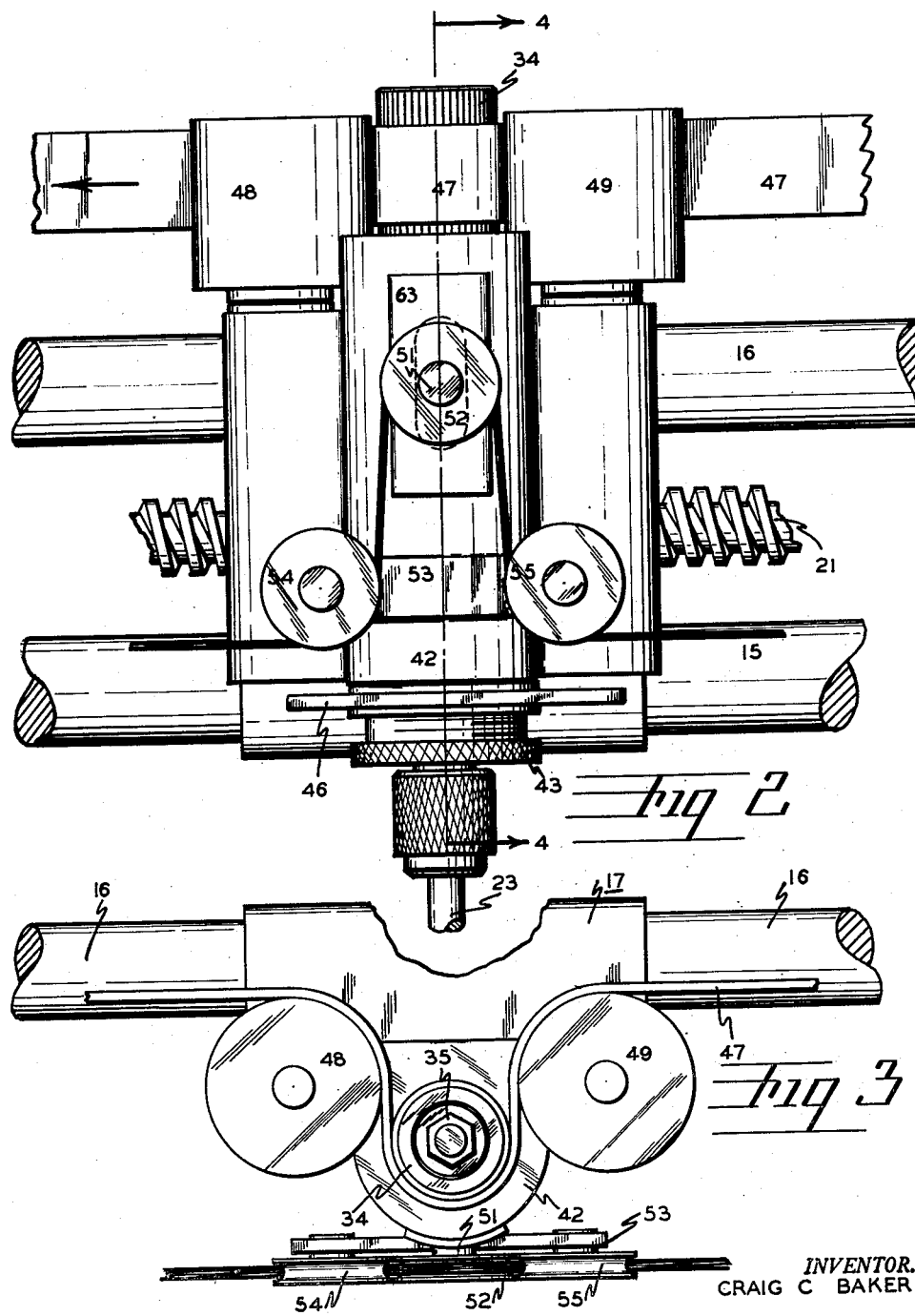
Fig. 2 is an enlarged fragmentary front elevation of the router head assembly.
Fig. 3 is a fragmentary plan view of my assembly.

The router head assembly (see also Fig. 2) is slidably supported on a pair of horizontal bars 15 and 16 which are in vertical alignment with each other and with the shaft for the mounting cylinder 12. These bars are rigidly supported at their ends in the walls of the housing 10.

The router assembly includes a carriage indicated in general by the reference character 17 (Fig. 4), and sleeve portions 18 and 19 on the rear portion of the carriage 17 provide slidable mounting for the carriage and router assembly on the supporting bars 15 and 16 respectively. The carriage 17 is also formed with an internally threaded sleeve 20 through which a horizontal screw shaft 21 extends. The horizontal screw shaft 21 (Figs. 1, 2 and 4) is arranged in vertical alignment with the supporting bars 16 and 15 and its ends are rotatably supported within the housing 10. Means (not shown) are provided for rotating the screw shaft in either direction whereby to cause the carriage 17 and router assembly to move transversely in either direction, as desired, above the stereotype plate. This means for rotating the threaded shaft 21 includes electrically operated means with suitable control switches and manually operated means with gears connected to the external hand wheel 22 (Fig. 1), whereby the threaded shaft 21 may be rotated in either direction manually through the medium of the hand wheel 22, or may be rotated in either direction by throwing the appropriate electric control switch.

All the control means and supporting means thus far referred to are old in the art and therefore need not be described in detail.

Figure 4:
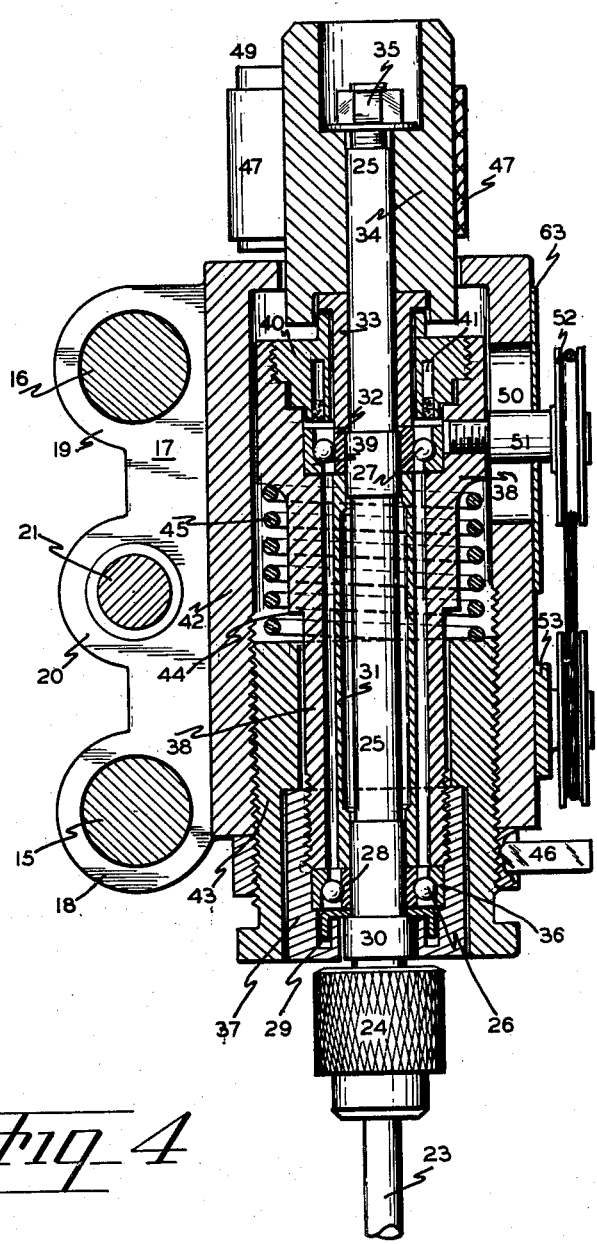
Fig. 4 is a vertical section through the assembly taken on line 4—4 of Fig. 2, but drawn to a larger scale.

The router tool or drill 23 is adjustably secured in a chuck 24 of well-known design, and the chuck 24 in turn is carried on the lower end of a spindle shaft 25 (Fig. 4). The spindle shaft is mounted for rotation in lower and upper bearings 26 and 27. The inner race 28 for the lower bearings 26 is held in position between a bottom seal ring 29 and a spacer sleeve 31, the bottom seal ring 29 resting against a shoulder on the spindle shaft formed by the enlarged diameter portion 30 of the spindle shaft. The inner race 32 for the upper bearings 27 is held in position by the spacer sleeve 31 and an upper spacer 33. A drive pulley 34 is firmly clamped on the spindle shaft by means of a nut and washer 35 and bears tightly down on the upper spacer 33. Thus pulley 34, upper spacer 33, race 32, spacer 31, race 28, and seal ring 29, as well as the chuck 24 and drill 23, rotate in unison with the spindle shaft.

The outer race 36 for the lower bearings 26 is held in place by a bottom bearing retainer 37 which is screwed on the bottom end of a spindle-supporting sleeve 38. The outer race 39 for the upper bearings 27 is carried in a shouldered recess in the upper portion of the supporting sleeve 38. An oil ring 40 is screwed in the top of the spindle-supporting sleeve 38 and carries an annular oil channel 41 with suitable packing in the bottom thereof and is provided with an oil inlet (not shown).

The carriage 17 supports an assembly housing 42 which has a cylindrical chamber, open at top and bottom, within which the spindle assembly is supported. A retaining collar 43 is adjustably screwed within the bottom portion of the inner cylindrical wall of the housing 42. The spindle-supporting sleeve 38 has a lower annular shoulder 44 adapted to engage the top of the retaining collar 43 when the spindle assembly is in its lowest position in the router head. A spring 45, seated in the top of collar 43, has its upper end in engagement with an upper annular shoulder on the spindle-supporting sleeve 38. The retaining collar 43 is formed with an inner annular recess in the bottom to accommodate the bottom bearing retainer 37. When the spindle-supporting sleeve 38 is raised to its normal uppermost position by the spring 45, the top of the bearing retainer 37 will be in engagement with the shoulder at the top of the inner recess in the collar 43, as shown in Fig. 4; and when the spindle-supporting sleeve 38 is pushed down to its lowest position against the force of the spring 45, the shoulder 44 of the spindle-supporting sleeve 38 will be in engagement with the top of the collar 43. Consequently the position of the collar 43 determines the limits of the up and down movement of the sleeve 38 and thus of the entire spindle assembly. Since the collar 43 has threaded engagement with the housing 42 its position with respect to the housing 42 may be given limited adjustment, and a locking ring 46 secures the collar 43 in the desired position to which it is adjusted.

The spindle 25, and with it the drill 23, is rotated in the usual manner by means of an endless belt 47 (see also Figs. 1, 2 and 3), which belt passes over end pulleys (not shown) within each side of the housing 10 and which is driven by a suitable electric motor (not shown). This endless belt 47 passes around a pair of idler pulleys 48 and 49 (Figs. 2 and 3) on opposite sides of the spindle pulley 34 and passes around the intermediately positioned spindle pulley. The spindle pulley 34 is made of sufficient height so that when the spindle assembly is pushed down from the normal raised position shown in the drawings to the lowest position, the spindle pulley 34 will still be engaged by the driving belt 47. Thus as long as the belt 47 is being driven by the router motor the spindle assembly will be rotated regardless of the transverse travel of the router head carriage 17 and regardless of whether the spindle assembly is in raised or lowered position in the router head.

The manner in which, and the means by which, the rotating spindle assembly, including the drill 23, can be lowered a predetermined distance for engagement with the stereotype plate—which constitutes a very important feature of my invention—will now be briefly described.

A vertical slot 50 (Fig. 4) is provided in the front wall of the spindle assembly housing 42 and extends parallel to the spindle 25. The plane determined by the slot 50 and the spindle 25 is perpendicular to the plane determined by the two carriage-supporting bars 15 and 16. A horizontal stub shaft 51, the reduced inner end of which is threaded and rigidy secured in the spindle-supporting sleeve 38, extends through the slot 50. A pulley 52 is rotatably mounted on the outer end of the shaft 51. A horizontal bracket plate 53 is secured to the front of the housing 42 below the slot 50 and supports mountings for a pair of pulleys 54 and 55 which are thus positioned below and on opposite sides of the pulley 52, respectively.

A cable 56 passes around the pulleys 54 and 55 and over pulley 52. This cable also passes over pulleys 57 and 58 (Fig. 5), mounted inside the router housing 10 at opposite sides thereof. The ends of the cable 56 at both sides extend downwardly. One cable end passes around a pulley 60 on the end of a cable-holding shaft 59. The other end of this shaft 59 is secured within the housing 10. As indicated in Fig. 5, the shaft 59 is hollow and a cable-anchoring block 61 extends through a slot in the shaft 59 and is carried on an inner adjusting screw (not shown) so that the position of the block 61 may be adjusted longitudinally on the shaft 59. One end of the cable 56 is secured to the block 61. As evident, the block 61 is adjustably mounted in order to permit the cable 56 to be tightened slightly in the event any unnecessary slack should be developed in the cable which might, for example, be caused by gradual stretching of the cable. The other end of the cable 56 is attached to a foot lever or pedal 62 which is normally held in raised position.

As will now be apparent, downward pressure on the foot lever or pedal 62 by the operator's foot will cause the cable 56 to pull downwardly on the pulley 52 and thus will pull the spindle-supporting sleeve 38 and therewith the entire spindle assembly downward against the force of the spring 45 to the extent permitted by the collar 43 (Fig. 4).

In using my improved router the glass door or window 11 is opened and the stereotype plate 13 is mounted in position on the cylinder 12 in the usual manner. Assuming that the drill or router tool 23 is already in position in the chuck 24, the depth to which the drill will be lowered when the spindle assembly is moved down to the lowest position permitted by the collar 32 is observed, and if such depth does not correspond to the desired depth for the routing operation, the limiting collar 43 is adjusted and set for the correct predetermined depth. The router is then ready for operation and the switch for the motor which drives the endless belt 47 is turned on to produce the necessary constant rotation of the spindle assembly and drill during the entire operation.

The window 11 is preferably kept closed during the routing operation so as to confine the small dislodged chips of metal within the router housing 10. In order to prevent such metal chips from getting into the slot 50 in the spindle assembly housing, a cover plate 63 is mounted on the stub shaft 51 (Fig. 4) on the outside of the spindle assembly housing, and is held in place by a suitable spring (not shown) on the shaft. The cover plate 63 is made large enough to cover the slot 50 at all times and the cover plate thus slides up and down on the outside of the spindle assembly housing with the up and down movement of the spindle assembly.

As mentioned previously, the screw shaft 21 may be rotated either by electrical means or may be rotated manually through the hand wheel 22 in order to impart transverse movement to the entire router head in either direction as required. For ordinary routing operations I believe it is preferable to have the transverse movement of the entire router head produced manually by the operator. Thus with one hand on the wheel 22, for moving the router head in either direction transversely, and with the other hand on the wheel 14, for rotating the cylinder 12 and the stereotype plate either towards or away from the operator, and finally with one foot in position for pressing down on the foot lever 62, to bring the routing drill down on the stereotype plate, the operator, while watching the work through the window 11, is able to perform the routing operation easily and accurately and with a minimum expenditure of time and effort.

Various modifications could of course be made in the construction of various parts of my router, as for example, in the individual members of the spindle assembly. Variation could also be made in the particular means employed for lowering and raising the spindle and drill, all of which variations would be within the scope of my invention. In actual practice, however, I have found that my router when constructed substantially as illustrated in the drawings, is very satisfactory and consequently I regard the construction which I have illustrated as a preferred form for carrying out my invention. However it is to be understood that my invention is not limited except as set forth in the claims.

I claim:

1. In a router of the character described, the combination of a rotatable work support mounted on a fixed horizontal axis, means for rotating said work support, a router head, means supporting said router head a fixed distance above said work support, said router supporting means including a pair of stationary horizontal bars extending parallel to said axis of said work support, means for moving said router head transversely on said horizontal bars, a spindle assembly, a mounting in said router head for said spindle assembly, said spindle assembly rotatably supported in said mounting for rotation on a substantially vertical axis, means for rotating said spindle assembly, means for moving said mounting and therewith said spindle assembly up and down in a substantially vertical direction in said router head, said means for moving said mounting including a spring element normally holding said mounting in raised position and a flexible element and pulley assembly for enabling a downward pull to be exerted on said mounting in opposition to said spring element, and means limiting the latter mentioned movement of said mounting in opposition to said spring.

2. In a router of the character described, the combination of a movable work support mounted on a fixed horizontal axis, means for moving said work support, a router head, means supporting said router head a fixed distance above said horizontal axis, means for producing parallel horizontal relative movement of said router head and said work support with respect to each other, a spindle assembly, a mounting in said router head for said spindle assembly, said spindle assembly rotatably supported in said mounting for rotation on an axis extending towards said work support axis, means for rotating said spindle assembly, said spindle assembly mounting and said spindle assembly movable in said router head towards and away from said work support, an adjustable collar in said router head co-axial with said spindle assembly mounting, a shoulder on said spindle assembly mounting adapted to engage said collar when said spindle assembly mounting is moved towards said work support, a spring element urging said spindle assembly mounting in a direction away from said work support, and manually operable means for moving said spindle assembly mounting and therewith said spindle towards said work support against the force of said spring to the extent permitted by said adjustable collar.

3. A router of the character described including a rotatable work support mounted on a fixed horizontal axis, means for rotating said work support, a router head, means supporting said router head a fixed distance above said horizontal axis, means for moving said router head on said router head supporting means in a direction parallel to said work support axis, a spindle assembly, a mounting in said router head for said spindle assembly, said spindle assembly rotatably supported in said mounting for rotation on an axis substantially perpendicular to said work support axis, means for rotating said spindle assembly, said spindle assembly mounting and said spindle assembly movable in said router head towards and away from said work support axis, an adjustable collar in said router head co-axial with said spindle assembly mounting, said spindle assembly mounting extending through said collar, a shoulder on said spindle assembly mounting adapted to engage said collar when said spindle assembly mounting is moved towards said work support axis, a second shoulder on said spindle assembly mounting adapted to engage said collar when said spindle assembly mounting is moved in a direction away from said work support axis, a spring element urging said spindle assembly mounting in a direction away from said work support axis, and a flexible element and pulley assembly for moving said spindle assembly mounting and therewith said spindle towards said work support axis against the force of said spring to the extent permitted by said adjustable collar.

CRAIG C. BAKER.

References Cited in the file of this patent

UNITED STATES PATENTS

| Number | Name | Date |
|---|---|---|
| 113,651 | Gray | Apr. 11, 1871 |
| 1,402,901 | Shaw | Jan. 10, 1922 |
| 1,829,393 | Carter | Oct. 27, 1931 |
| 1,889,653 | Gorton | Nov. 29, 1932 |
| 2,116,122 | Oceanasek | May 3, 1938 |
| 2,178,130 | Zwick | Oct. 31, 1939 |
| 2,322,129 | Hawkins | June 15, 1943 |
| 2,357,117 | Jonsson | Aug. 29, 1944 |
| 2,360,725 | Segur | Oct. 17, 1944 |